Figure 1:
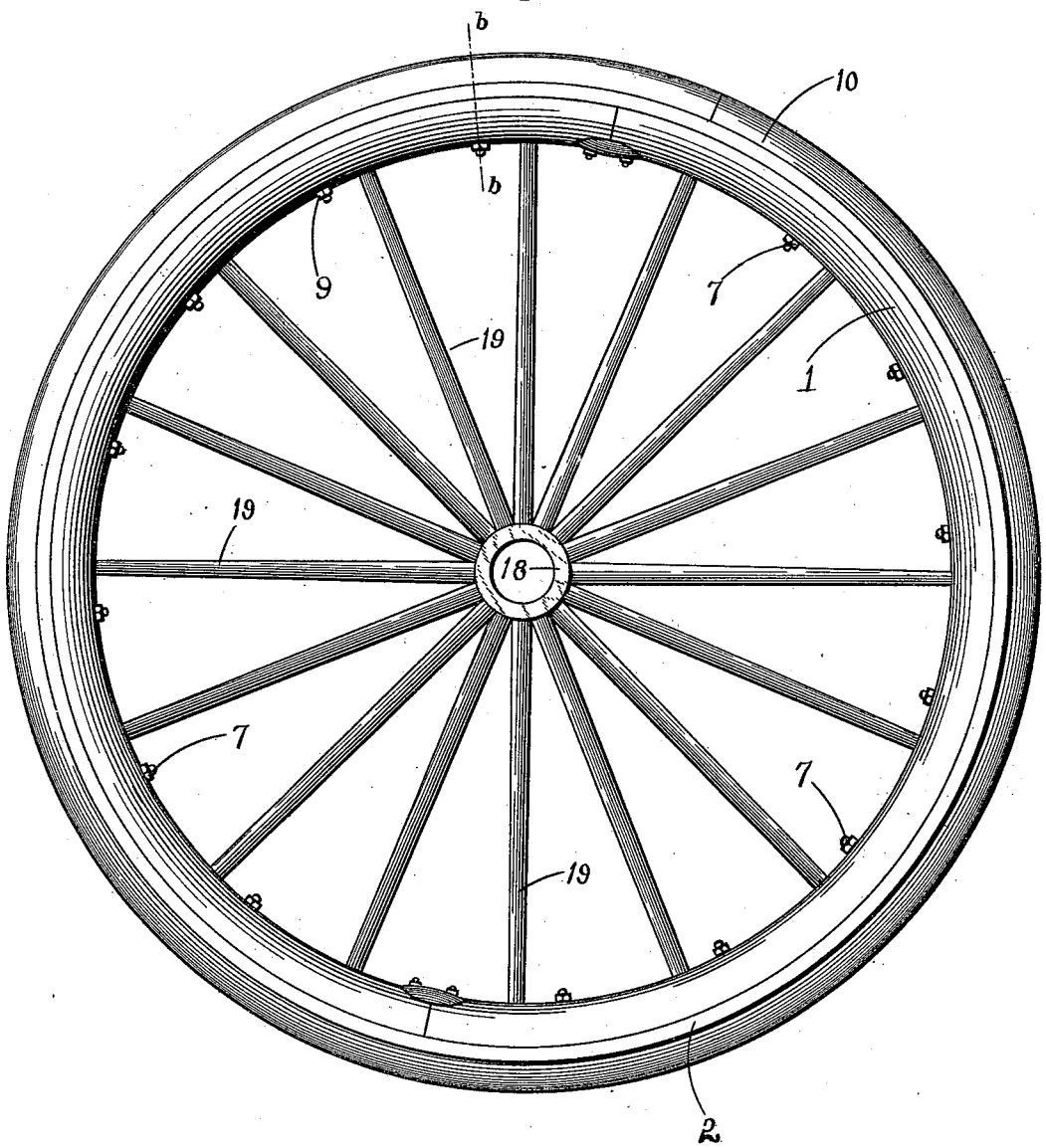

No. 635,385. Patented Oct. 24, 1899.
R. MULHOLLAND.
RUBBER TIRED WHEEL.
(Application filed June 30, 1899.)

(No Model.) 3 Sheets—Sheet 1.

Witnesses.
L. M. Billings.
G. A. Neubauer

Richard Mulholland. Inventor.
By A. J. Sangster
Attorney.

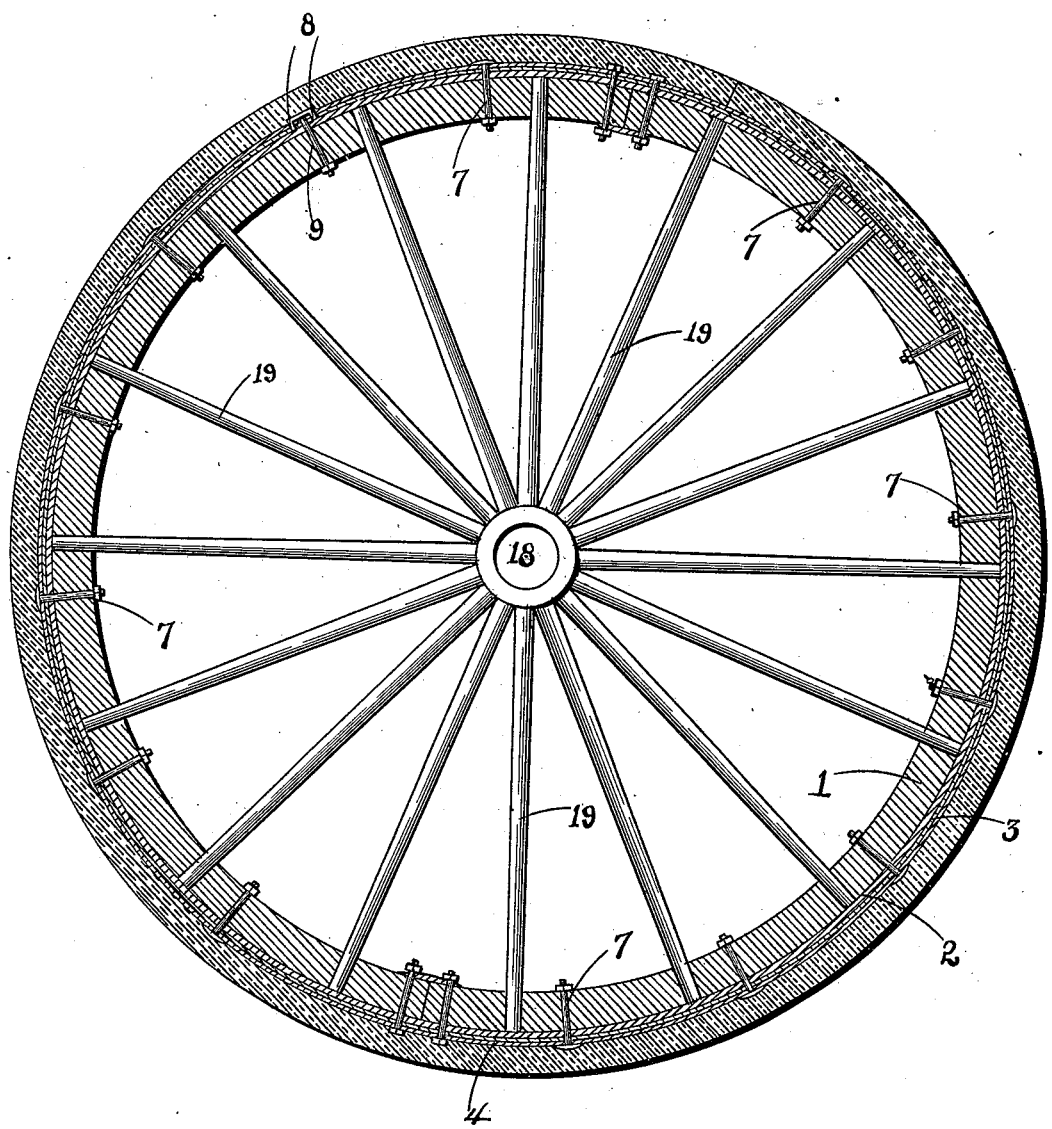

No. 635,385. Patented Oct. 24, 1899.
R. MULHOLLAND.
RUBBER TIRED WHEEL.
(Application filed June 30, 1899.)
(No Model.)
3 Sheets—Sheet 3.
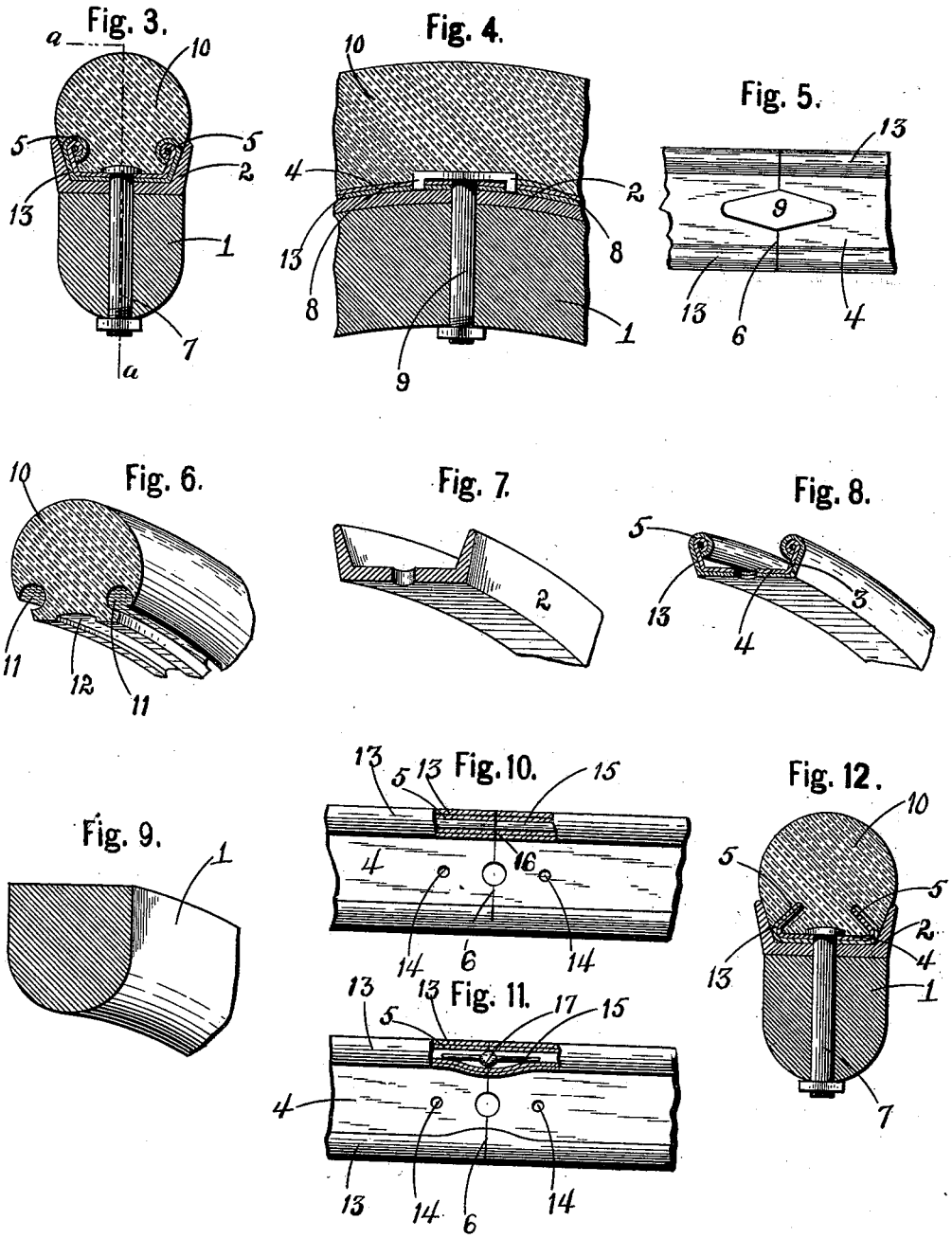

UNITED STATES PATENT OFFICE.

RICHARD MULHOLLAND, OF DUNKIRK, NEW YORK.

RUBBER-TIRED WHEEL.

SPECIFICATION forming part of Letters Patent No. 635,385, dated October 24, 1899.

Application filed June 30, 1899. Serial No. 722,443. (No model.)

*To all whom it may concern:*

Be it known that I, RICHARD MULHOLLAND, a citizen of the United States, and a resident of Dunkirk, in the county of Chautauqua and State of New York, have invented certain new and useful Improvements in Rubber-Tired Wheels, of which the following is a specification.

My invention relates to improvements in rubber-tired wheels for vehicles, and has particular reference to that class of tires wherein a tire of rubber or other elastic material is secured in a channeled rim surrounding the felly of the wheel. Heretofore in this class of tire the common method of securing the rubber tire in the metal channeled rim has been by extending wire or various forms of flat or round bands longitudinally through the rubber surrounding the felly of the wheel and uniting the ends to hold the rubber tire in place. In my experience I have found these to be objectionable, as in passing through the rubber they cut and weaken it, and it also requires considerable experience and skill to put the tire on the wheel. Another objection to this class of rubber tire as at present constructed is the "creeping" or sliding of the rubber in the channel of the rim when in use under pressure.

The object of my invention is to overcome these objections and to produce a tire which is comparatively cheap and which can be easily constructed and applied to the wheel or felly.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 1 represents a side elevation of a vehicle-wheel having my improved tire applied thereto. Fig. 2 is a central longitudinal section through the same on or about line $a\ a$, Fig. 3. Fig. 3 is an enlarged transverse section on or about line $b\ b$, Fig. 1. Fig. 4 is an enlarged section of a wheel having my improved tire. Fig. 5 is a top plan view of a portion of the inner metal channeled rim. Fig. 6 is a perspective view of a section of the rubber tire molded ready to receive the inner metal channeled rim and cushion. Fig. 7 is a perspective view of a portion of the outer channeled rim. Fig. 8 is a perspective view of a portion of the inner metal channeled rim and the lining or bushing. Fig. 9 is a perspective view of the felly. Fig. 10 is a top plan view of a portion of the inner metal channeled rim, illustrating short wires formed with thin central fins which fit into the end openings of the side flanges for preventing side or lateral movement of the ends of said inner metal channeled rim at their juncture. Fig. 11 is also a top plan view of a portion of the inner metal channel, illustrating a modified form of the wire device shown in Fig. 10. Fig. 12 is a transverse section through a modified form of my improved wheel and tire.

In referring to the drawings for the details of construction like numerals designate like parts.

In constructing and applying my improved tire to vehicles or analogous wheels the operation is substantially as follows: The felly 1 and the outer metal channeled rim 2 are of well-known construction and are applied to the wheel in the usual manner. The inner metal channeled rim 3 is preferably formed of a flat piece of metal of a width sufficient to form the base 4 and side flanges 5, which are bent inward, so as to be narrower at the top than at the bottom or base, the purpose of which will be fully explained hereinafter. The edges of the flanges 5 are preferably rounded over, as shown in Figs. 3 and 8; but they may also be bent inward at any desired angle, as shown in the modified form in Fig. 12. The inner metal channeled rim 3 when formed as described is fitted into and around the metal channeled rim 2 until the ends meet, as shown at 6 in Figs. 5, 10, and 11. The ends are held in place and holes are drilled through the metal channeled rims 2 and 3 and the felly 1 at suitable distance apart around the wheel, also through the joined ends 6, to receive the bolt 9. Holes 14 are also drilled at a short distance each side of the ends 6 through the metal channeled rim 3 to receive the lugs 8, projecting downward from the lower surface of the head of the T-bolt 9, as shown in Fig. 4. The inner metal channeled rim 3 is then temporarily removed from the wheel, and the bolts 7 are inserted into the holes. The rubber tire 10, a section of which is shown in Fig. 6, is formed of rubber or other elastic material and is preferably molded and made to fit the form of the inner metal channeled rim 3, as shown in Fig. 5, and for that purpose has depressions or cavities 11 extending longitudinally along its sides to receive the rounded ends of the flanges 5 of the inner metal channeled rim and a cavity or depression 12 extending longitudinally along its lower surface or bottom to provide space for the protruding heads of the bolts 7 and 9. While I prefer the form of tire shown in Fig. 6 to fit the inner metal channeled rim shown in Figs. 3, 5, and 8, it will be observed that the rubber tire may be made in a variety of shapes to fit the modified or analogous forms shown in Fig. 12, and I therefore do not desire to confine myself to the particular form shown in Fig. 6, as in some cases it may be found desirable and by some persons preferable to modify the form of tire and inner metal channeled rim. In most of the figures I have shown a bushing or lining 13, of leather or other suitable material, which is preferably secured either to the exterior of the inner metal channeled rim 3 or to the interior of the metal channeled rim 2 by cement or equivalent means. This lining forms an interlocking cushion between the inner and outer metal channeled rims 2 and 3 and effectually prevents all tendency to vibration and rattle of said rims relatively to each other. By referring to the drawings, particularly Fig. 3, it will be seen that in the preferred construction the middle portion only of the bushing or lining is interposed between the inner and outer rims and that the sides of the bushing bend around and follow the curve of the flanges of the inner rim, thus forming a flexible bushing between the interior surface of the side depressions 11 and the surface of the rigid metallic flanges. Owing to the yielding nature of the bushing the wearing of the rubber in the depressions during the operation of the wheel is materially lessened and the life of the tire is greatly lengthened. The rubber tire 10 is longer than the circumference of the inside of the metal channeled rim 2 to allow for the lengthwise compression of the rubber and consequent longitudinal contraction of the tire when in its place on the wheel. It is slid longitudinally into the inner metal channeled rim 3, the rounded ends of the flanges 5 moving easily in the cavities 11. The inner metal channeled rim is again arranged upon the outer metal channeled rim, and the bolts protruding through the inner metal channeled rim 3 are inserted and passed through the openings, previously described, in the metal channeled rim 2 and the felly 1, first entering the bolt nearest to the longitudinal center of the metal channeled rim 3 into the corresponding hole in the metal rim 2 and felly 1. The bolt-nut of said bolt is then screwed up, and the metal rim 3 and the rubber tire 10 in proximity to said bolt are drawn to their place in the metal channeled rim 2. The bolts at each side of the center bolt are now entered into their corresponding holes and the parts drawn to their place in like manner. The rubber tire is then clamped and firmly held at or near the point of the entrance of the first bolt, and with a suitable device the rubber is compressed lengthwise on each side thereof and held in its compressed condition. This operation of entering the bolts and holding and longitudinally compressing the rubber tire is repeated until all the bolts are entered in their respective holes and the rubber tire is drawn to its place in the channel of the metal rim 2. In longitudinally compressing the rubber tire in the manner described it necessarily has become shorter than the inner metal channeled rim 3, which now protrudes from each end of the rubber tire. The ends 6 of the inner metal channeled rim 3 are secured to the outer metal channeled rim 2 and felly 1 by the T-bolt 9 in the manner shown in Figs. 4 and 5, in which the downwardly-extending projections or lugs 8 fit into openings in the inner metal channeled rim and lock the ends of said rim to each other against longitudinal and vertical movement. The compressed rubber tire which has been held at each side of the joined ends 6 is now loosened and the ends are permitted to slide together and to form a solid butt-joint. By this means the rubber is compressed equally all around the circumference of the wheel.

It will be observed that in compressing the rubber tire the rubber will press down upon the heads of the bolts 7 and 9 in the channel 12 of the rubber tire, and thereby become embedded in the same. The tire 10 will thus be prevented from creeping or slipping in the metal channeled rim 2, which is a serious objection in tires as now constructed.

In the preferred construction of the inner metal channeled rim, in which the sides 5 are curled or rounded upon themselves, the ends are preferably more rigidly fastened to each other by inserting or entering the ends of a short wire 15, having a thin peripheral fin 16 extending outwardly from at or near its middle into the openings formed by the rounding or curling of the sides upon themselves. The fin 16 of the wire interposes itself between the ends of the metal channeled rim 3, serving to prevent longitudinal movement of the wire through the openings, and as the fin is very thin it allows the ends to be brought nearly together to form a comparatively close joint. (See Fig. 10.)

In the modified form shown in Fig. 11 an enlargement 17 is formed on the wire by slightly upsetting the same or by similar means in lieu of the thin fin 16, and the curled or rounded sides at the ends of the rim 3 are opened or enlarged sufficiently to form seats to receive the same when the ends of the wire are inserted in the openings in the rim ends, substantially as shown in said Fig. 11. This allows the ends of the metal channeled rim to be brought into close contact with each other. These wires further strengthen the joint between the ends of the inner metal channeled rim 3, lock them more rigidly to each other, and also prevent lateral or vertical movement of said ends.

It will be seen from the foregoing that my invention essentially comprises an inner and an outer metal channeled rim superimposed upon and arranged in direct contact with each other and surrounding the felly of the wheel, thus practically forming what may be called a "double or two-piece metal channeled rim." This construction insures the rigid binding of the felly of the wheel and firmly holds the rubber tire in place, thereby retaining the full strength of the rubber and producing a tire of great endurance and efficiency.

It is obvious that the metal channeled rim 3 may be of any external or internal form having a flat or analogous-shaped base resting against the interior of the outer metal channeled rim 2 and sides flaring inward, so that when the rubber tire 10 is extended longitudinally through it a dovetail is formed to prevent the vertical or lateral movement or removal of the tire therefrom.

The hub and spokes of the wheel are of any well-known construction and are respectively designated by the numerals 18 and 19.

I claim as my invention—

1. A vehicle-wheel having a felly, an inner metal channeled rim and an outer metal channeled rim superimposed upon each other and upon the felly and a rubber tire superimposed upon and secured in the inner metal channeled rim in a longitudinally-compressed condition, and bolts passing through the felly and the inner and outer channeled rims with their heads embedding in the tire, as set forth.

2. A vehicle-wheel having a felly, an outer metal rim superimposed upon said felly, an inner metal rim superimposed upon said outer rim, a rubber tire superimposed upon and secured in the inner metal rim, and a bushing of leather interposed between the inner rim and the outer rim, as set forth.

3. A vehicle-wheel having a felly, an outer metal channeled rim superimposed upon said felly, an inner metal channeled rim superimposed upon said outer rim and having its sides flaring inwardly, a solid rubber tire having longitudinal depressions into which the flaring sides of the inner rim are adapted to fit and bolts passing through the felly, outer rim, and inner rim for securing them together, as set forth.

4. A wheel having a felly, a metal rim superimposed upon said felly, a tire superimposed upon and secured in said rim; said rim having openings near its ends and a bolt passed through the felly and having lugs fitting in the openings in the rim to lock the ends to each other.

5. A wheel having a felly, a metal rim superimposed upon said felly, a tire superimposed and secured in said rim, and a plurality of bolts for fastening the metal rim to the felly, one of said bolts having means for locking the ends of the rim to each other.

6. A wheel having a felly, a metal rim superimposed upon said felly having its sides curled or rounded upon themselves to form inwardly-flaring side flanges, a rubber tire having longitudinally-extending depressions in its sides into which the side flanges of the rim seat to secure the tire to the wheel against lateral or vertical displacement, means for fastening the rim to the felly, and wires having their ends inserted in the openings formed by curling or rounding the sides of the rim upon themselves for preventing lateral or vertical movement of the ends of the rim, as set forth.

7. A wheel having a felly, a metal rim superimposed upon said felly having its sides curled or rounded upon themselves to form inwardly-flaring side flanges, a rubber tire having longitudinally-extending depressions in its sides into which the side flanges of the rim seat to secure the tire to the wheel against lateral or vertical displacement, means for fastening the rim to the felly, and wires provided with peripheral enlargements having their ends inserted in the openings formed by curling or rounding the sides of the rim upon themselves with the enlargements interposed between the ends of the rim for preventing lateral or vertical movement of the ends of the rim, as set forth.

8. A wheel having a felly, a metal rim superimposed upon said felly having its sides curled or rounded upon themselves to form inwardly-flaring side flanges, a rubber tire having longitudinally-extending depressions in its sides into which the side flanges of the rim seat to secure the tire to the wheel against lateral or vertical displacement, means for fastening the rim to the felly, and wires provided with a thin peripheral fin having their ends inserted in the openings formed by curling or rounding the sides of the rim upon themselves with the fin interposed between the ends of the rim for preventing lateral or vertical movement of the ends of the rim, as set forth.

9. A vehicle-wheel having a felly, two independent metallic rims having longitudinal channels superimposed upon each other and upon the felly, a rubber tire surrounding the rims and secured in the channel of the interior rim, and bolts extending through the felly and the rims for securing them together; one of said bolts having means for fastening the ends of the interior rim together.

10. A vehicle-wheel having a felly, two independent metallic rims having longitudinal channels superimposed upon each other and upon the felly, and the interior rim having transverse openings near its end, a rubber tire surrounding the rims and secured in the channel of the interior rim, and bolts extending through the felly and the rims for securing them together; one of said bolts having projections fitting in the transverse openings for fastening the ends of the interior rim together.

11. A vehicle-wheel having a felly, two independent metallic rims having longitudinal channels superimposed upon each other and upon the felly, a rubber tire surrounding the rims and secured in the channel of the interior rim, and bolts extending through the felly and the rims for securing them together; one of said bolts being provided with projections extending downwardly from its head and adapted to enter into the transverse openings in the interior rim to lock the ends of said rim together, as set forth.

12. A vehicle-wheel having a felly, an outer rim superimposed upon said felly, an inner metallic rim superimposed upon said outer rim and having its sides curled or rounded upon themselves to form inwardly-flaring longitudinal flanges and transverse openings near its ends, a solid rubber tire having longitudinal depressions in its sides into which the flanges of the inner rim fit, bolts passing through the felly and inner and outer rim for fastening them together, one of said bolts having projections fitting in the transverse openings in the inner rim and short wires fitting in the openings formed by curling or rounding the sides of the inner metallic rim upon themselves for strengthening the joints between the ends and also additionally fastening the ends of said rim to each other against lateral or vertical displacement, as set forth.

13. A vehicle-wheel having a felly, an outer metallic channeled rim superimposed upon said felly, an inner metallic rim having its sides bent upon themselves to form inwardly-flaring flanges, a flexible lining or cushion interposed between the inner and outer rim, a rubber tire provided with longitudinal depressions on its sides and a longitudinal depression in its bottom, said tire being adapted to be secured to the inner rim by entering flanges in the side depressions and moving it longitudinally, and bolts passing through the felly and inner and outer rims for securing them together, having their heads protruding into the bottom depression in the tire; one of said bolts having means for locking the ends of the inner metallic rim to each other, and the tire being adapted to be longitudinally compressed into its seat in the inner rim at all points of its circumference, thereby pressing the rubber against the protruding heads of the bolts to prevent "creeping" or longitudinal movement of the tire upon the wheel, as set forth.

14. A vehicle-wheel having a felly, an outer and inner rim superimposed one upon the other and upon said felly, a rubber tire superimposed upon and secured in the inner rim, and a flexible lining interposed between the inner rim and the outer rim, as set forth.

15. A vehicle-wheel having a felly, an outer and inner rim superimposed one upon the other and upon the felly, an elastic tire superimposed upon and secured in one of the rims, and a flexible lining interposed between the inner rim and the outer rim, as set forth.

16. A vehicle-wheel having a felly, an outer metal rim and an inner metal rim superimposed upon the felly, one of the rims having rounded inwardly-flaring sides, a tire having longitudinally-extending depressions in its sides into which the flaring sides of the rim seat, to secure the tire to the wheel against lateral or vertical displacement and means for fastening the rims, tire and felly together, as set forth.

17. A vehicle-wheel having a felly, two independent metallic rims superimposed upon each other and upon the felly, a rubber tire superimposed upon and secured to said rims and bolts for securing the rims together and to the felly.

18. A vehicle-wheel having a felly, an outer metal rim superimposed upon said felly, an inner metal channeled rim superimposed upon said outer rim and having its sides flaring inwardly, a tire having longitudinal depressions into which the flaring sides of the inner rim are adapted to fit and a flexible bushing interposed between the inner and outer rims with its sides bent upon the flaring sides of the inner rim and interposed between said flaring sides and the tire, as set forth.

19. A vehicle-wheel having a felly, an outer metal rim superimposed upon said felly, an inner metal rim superimposed upon said outer rim, a tire superimposed upon and secured in the inner metal rim, and a flexible bushing of leather having its middle portion interposed between the inner rim and the outer rim and its sides interposed between the inner rim and the tire, as set forth.

20. A wheel having a felly, a metal rim superimposed upon said felly, having its sides curled or rounded upon themselves to form inwardly-flaring side flanges, a rubber tire having longitudinally-extending depressions in its sides into which the side flanges of the rim seat to secure the tire to the wheel against lateral or vertical displacement, means for fastening the rim to the felly and a bushing of flexible material interposed between the side flanges and the surface of the depressions, as set forth.

21. A wheel having a felly, an outer metal rim superimposed upon said felly, an inner metal rim superimposed upon the outer metal rim and having its sides curled or rounded upon themselves to form inwardly-flaring side flanges, a rubber tire having longitudinally-extending depressions in its sides into which the side flanges of the inner rim seat, to secure the tire to the wheel against lateral or vertical displacement, means for fastening the rims to the felly, and a flexible bushing interposed between the rims and having its sides bending upon the flaring side flanges of the inner rim and interposed between the outer surface of the flange and the inner surface of the depressions, as set forth.

22. A vehicle-wheel having a felly, two independent metallic rims having longitudinal channels superimposed upon each other and upon the felly, an elastic tire surrounding the rims and secured in the channel of the interior rim, and bolts extending through the felly and the rims for securing them together; said bolts having means for fastening the ends of the interior rim together.

23. A vehicle-wheel having a felly, an outer rim superimposed upon said felly, an inner metallic rim superimposed upon said outer rim and having its sides curled or rounded upon themselves to form inwardly-flaring longitudinal flanges and transverse openings near its ends, a tire having longitudinal depressions in its sides into which the flanges of the inner rim fit, and a longitudinal depression in its bottom and bolts passing through the felly and inner and outer rims for fastening them together and having their heads protruding into the bottom depression in the tire, as set forth.

24. A vehicle-wheel having a felly, an outer metallic channeled rim superimposed upon said felly, an inner metallic rim having its sides bent upon themselves to form inwardly-flaring flanges, a flexible lining or cushion interposed between the inner and outer rims, an elastic tire provided with longitudinal depressions in its sides and a longitudinal depression in its bottom, and bolts passing through the felly and inner and outer rims for securing them together, having their heads protruding into the bottom depression in the tire; the tire being adapted to be longitudinally compressed into its seat in the inner rim at all points of its circumference, thereby pressing the rubber against the protruding heads of the bolts to prevent "creeping" or longitudinal movement of the tire upon the wheel, as set forth.

25. A vehicle-wheel having a felly, an outer and inner rim superimposed one upon the other and upon the felly, a tire superimposed upon and secured in the inner rim, and a flexible lining partly interposed between the inner rim and the outer rim and partly interposed between the inner rim and the tire, as set forth.

26. A wheel having two independent superimposed metallic rims, a superimposed tire and a flexible bushing partly interposed between said rims and partly between one of said rims and the tire.

RICHARD MULHOLLAND.

Witnesses:
L. M. BILLINGS,
G. A. NEUBAUER.